United States Patent Office 3,472,855
Patented Oct. 14, 1969

3,472,855
1-[(BENZ[g]-INDOLYL)-LOWER-ALKYL]-
4-SUBSTITUTED-PIPERAZINES
Sydney Archer, Bethlehem, N.Y., assignor to Sterling Drug Inc., New York, N.Y., a corporation of Delaware
No Drawing. Continuation-in-part of application Ser. No. 481,075, Aug. 19, 1965, which is a continuation-in-part of application Ser. No. 254,475, Jan. 28, 1963. This application May 29, 1967, Ser. No. 642,196
Int. Cl. C07d 57/00; A61k 27/00
U.S. Cl. 260—268                                      3 Claims

ABSTRACT OF THE DISCLOSURE

New 1-[benz[g]-indolyl)-lower-alkyl]-4-substituted-piperazines :nd:c a+ad to be useful as tranquilizers, sedatives, skeletal muscle relaxants, adrenolytics, hypothermic agents, anti-convulsants, hypotensive, and cardiovascular agents.

The application is a continuation-in-part of my copending application Ser. No. 481,075, filed Aug. 19, 1965, now U.S. Patent 3,362,956, patent Jan. 9, 1968, which in turn is a continuation-in-part of my prior application Ser. No. 254,475, filed Jan. 28, 1963, and now abandoned.

This invention relates to certain 1-[(benz[g]-indolyl)-lower-alkyl]-4-substituted-piperazines, their acid-addition and quaternary ammonium salts, and to intermediates and processes therefor.

The compounds of the invention are represented by the general formula:

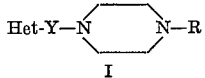

I wherein R is hydrogen or a lower-alkyl, hydroxy-lower-alkyl, phenyl, phenyl-lower-alkyl, benzhydryl, phenyl-lower-alkenyl, cycloalkyl-lower-alkyl, or pyridyl radical; Y is lower-alkelene of from one to six carbon atoms; and Het is a benz[g]-indolyl radical.

In the above general Formula I, when R represents a lower-alkyl radical, it can be straight or branched and can contain from one to about six carbon atoms and thus stands, inter alia, for methyl, ethyl, isobutyl, n-hexyl, and the like.

When R represents an hydroxy-lower-alkyl radical, it can be staright or branched, can contain from two to six carbon atoms and is such that the oxygen atom of the hydroxy-lower-alkyl group and the nitrogen atom of the piperazine ring are separated by at least two carbon atoms. R thus also stands, inter alia, for 2-hydroxyethyl, 3-hydroxy-1-methylpropyl, 6-hydroxyhexyl, and the like.

When R represents cycloalkyl-lower-alkyl, the cycloalkyl moiety contains from three to seven ring carbon atoms, while the lower-alkyl moiety contains from one to four carbon atoms. R thus also stands for cyclopropylmethyl, cyclobutylmethyl, cyclopentylmethyl, cycloheptylmethyl, 2-cyclohexylethyl, and the like.

When R represents phenyl, phenyl-lower-alkyl, benzhydryl, or phenyl-lower-alkenyl, the benzene ring of said radicals can be unsubstituted or can bear one or more substituents of low molecular weight and of such nature that they do not interfere with or take part in the reactions, to be described hereinafter, used in the preparation of the compounds. Moreover, the nucleus of the group, Het, can also be further substituted by one or more of such substituents. Examples of such substituents include halogen (including fluorine, chlorine, bromine, and iodine), lower-alkyl, hydroxy, lower-alkoxy, methylenedioxy, ethylenedioxy, lower-alkylmercapto, lower-alkylsulfinyl, lower-alkylsulfonyl, nitro, lower-alkanoyl, sulfamoyl, trifluoromethyl, and the like. When R represents a phenyl-lower-alkyl radical, the lower-alkyl moiety of said radical can contain from one to four carbon atoms, and when R represents a phenyl-lower-alkenyl radical, the lower-alkenyl moiety of said radical can contain from three to four carbon atoms. Thus R represents, inter alia, phenyl, benzyl, phenethyl, 4-phenylbutyl, benzhydryl, or cinnamyl, or such radicals substituted in the benzene ring by one or more substituents of the nature described above.

In the above general Formula I, the group Y represents lower-alkylene of from one to six carbon atoms, can be straight or branched, and when the group Y is attached to a nitrogen atom of the heterocyclic group, Het, is such that at least two carbon atoms separate the nitrogen atoms of the heterocyclic group and the piperizine ring. The lower-alkylene group, Y, thus stands, inter alia, for methylene, 1,2-ethylene, 1,3-propylene, 2-methyl-1,4-butylene, 1,6-hexylene, and the like.

The compounds of Formula I can also be substituted on the carbon atoms of the piperazine ring by one or more lower-alkyl radicals each containing from one to four carbon atoms.

The compounds of the present invention can be prepared by one or more of the following reactions in which Het, R, and Y have the meanings given above, Hal represents a halogen atom, Alk represents a lower-alkyl radical, and Y' is a single bond or lower-alkylene containing from one to five carbon atoms.

METHOD A

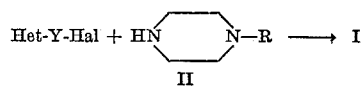

METHOD B

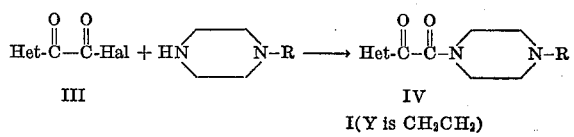

I(Y is CH₂CH₂)

METHOD C

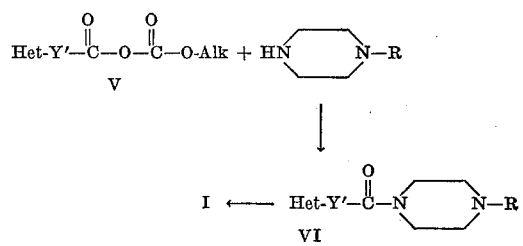

METHOD D

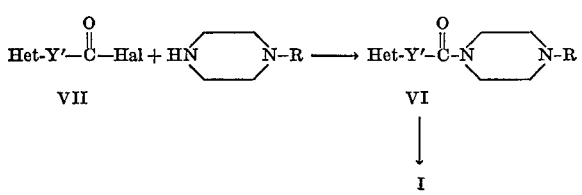

METHOD E

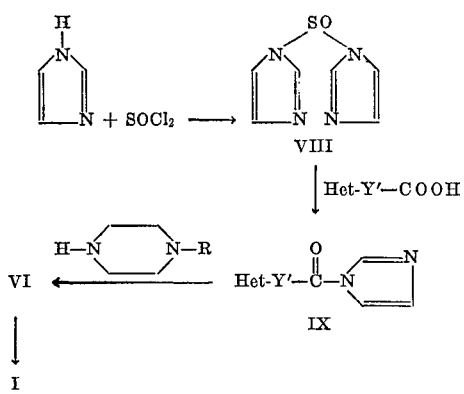

METHOD F

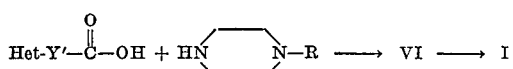

METHOD G

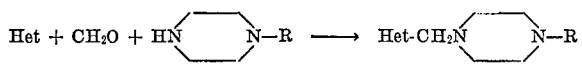

In Method A above, a (benz[g]-indolyl)-lower-alkyl halide is reacted with an appropriate 1-substituted-piperazine. The reaction is preferably carried out at a temperature between about 50° C. and 150° C. in the presence of an acid-acceptor in an organic solvent, inert under the conditions of the reaction, for example anhydrous ethanol, benzene, xylene, and the like. The purpose of the acid-acceptor is to take up the hydrogen halide which is split out during the course of the reaction. It is a basic substance which forms preferably water-soluble by-products easily separable from the main product of the reaction and includes such substances as alkali metal salts of weak acids, e.g. sodium carbonate, sodium bicarbonate, potassium carbonate, sodium acetate, sodium alkoxides, and the like. The acid-acceptor can also be in the form of an excess quantity of the 1-substituted-piperazine.

Method B is used to prepare the compounds of Formula I where Y is a 1,2-ethylene group. The intermediate (benz[g]-indolyl)glyoxalyl halides of Formula III required as intermediates in Method B are prepared by reacting a benz[g]indole with a glyoxalyl halide preferably at a temperature in the range from about −20° C. to 25° C. in an organic solvent inert under the conditions of the reaction, for example ether, petroleum ether, dioxane, tetrahydrofuran, and the like, thus affording the (benz[g]-indolyl)glyoxalyl halides of Formula III. The intermediates thus prepared are then reacted with a 1-substituted-piperazine to give the 1-[(benz[g]-indolyl)glyoxalyl]-4-substituted-piperazines of Formula IV. The reaction is preferably carried out at a temperature between about −5° C. and about 65° C. in the presence of an acid-acceptor in an organic solvent inert under the conditions of the reaction, such as tetrahydrofuran, ether, ethylene dichloride, and the like. The purpose and nature of the acid-acceptor are the same as that described above in the description of Method A. The 1-[benz[g]-indolyl)glyoxalyl]-4-substituted-piperazines thus prepared are reacted with an alkali metal aluminum hydride preferably at a temperature between about 0° C. and about 65° C. in an organic solvent inert under the conditions of the reaction, for example ether or tetrahydrofuran. It is preferred to use lithium aluminum hydride in refluxing tetrahydrofuran.

In Method C above, a (benz[g]-indolyl)-lower-alkane mixed anhydride of Formula V is reacted with an appropriate 1-substituted-piperazine to give the 1-[(benz[g]-indolyl)-lower-alkanoyl]-4-substituted-piperazines of Formula VI preferably at a temperature between about −20° C. and about 20° C. The latter, on reaction with an alkali metal aluminum hydride as described above in the description of Method B, afford the compounds of Formula I. The intermediate mixed anhydrides of Formula V used as starting materials in Method C are prepared by reacting a (benz[g]-indolyl)-lower-alkanoic acid with a lower-alkyl haloformate. The reaction is preferably carried out in the presence of an acid-acceptor, for example triethylamine, at a temperature between about −20° C. and about 20° C. in an organic solvent inert under the conditions of the reaction such as anhydrous acetone, ether, ethylene dichloride, and the like. Acetone is a preferred solvent. The acid-acceptor, which takes up the hydrogen halide split out during the course of the reaction, is preferably a basic substance which forms water-soluble by-products easily separable from the product.

In Method D above, a (benz[g]-indolyl)-lower-alkanoyl halide of Formula VII is reacted with a 1-substituted-piperazine to give the 1-[(benz[g]-indolyl)-lower-alkanoyl]-4-substituted-piperazines of Formula VI. The reaction is preferably carried out at a temperature in the range from about −5° C. to 65° C. in the presence of an acid-acceptor in an organic solvent inert under the conditions of the reaction, such as tetrahydrofuran, ether, ethylene dichloride, and the like. The purpose and nature of the acid-acceptor are the same as that described above in the description of Method A. The 1-[(benz[g]-indolyl)-lower-alkanoyl]-4-substituted-piperazines of Formula VI thus prepared are then reduced with an alkali metal aluminum hydride as described above in the description of Method C.

The 1-[(benz[g]-indolyl)-lower-alkanoyl]-4-substituted-piperazines of Formula VI can also be prepared according to Methods E or F. In Method E, N,N'-thionyldiimidazole of Formula VIII is first prepared by reacting imidazole with thionyl chloride. The former is then reacted with a (benz[g]-indolyl)-lower-alkanoic acid, and the resulting N-(benz[g]-indolyl-lower-alkanoyl)imidazole of Formula IX is reacted with a 1-substituted piperazine to produce the 1-[(benz[g]-indolyl)-lower-alkanoyl]-4-substituted-piperazines of Formula VI. If desired the N,N'-thionyldiimidazole and the N-(benz[g]-indolyl-lower-alkanoyl)imidazole intermediates can be isolated prior to reaction in the next succeeding step, but it is advantageous to carry out the entire sequence of steps up to the formation of the 1-[(benz[g]-indolyl)-lower-alkanoyl]-4-substituted-piperazines of Formula VI in essentially one operation, that is by reacting each intermediate without isolation with the next succeeding reactant using the same solvent medium for the entire sequence of reactions. Suitable solvents are organic solvents inert under the conditions of the reactions, for example tetrahydrofuran, diethyl ether, dibutyl ether, and the like. The reactions are preferably conducted at a temperature in the range from about −10° C. to about 50° C.

Alternatively the 1-[(benz[g]-indolyl)-lower-alkanoyl]-4-substituted-piperazines of Formula VI can be prepared according to Method F. This method requires the direct interaction of a heterocyclyl-lower-alkanoic acid with a 1-substituted-piperazine. The reaction is preferably conducted by direct fusion of the acid and the amine in the absence of any solvent and at a temperature sufficiently high to expel the water formed in the reaction. For this purpose, a temperature in the range from about 130° C. to 350° C. is suitable.

The 1 - [(benz[g]-indolyl)-lower-alkanoyl]-4-substituted-piperazines of Formula VI produced in each of Methods E and F are then reduced with an alkali metal aluminum hydride to the final products of Formula I as described above in the description of Method C.

Method G is used to prepare compounds of Formula I wherein the alkylene chain, Y, is methylene. The reaction is carried out by reacting a benz[g]-indole with formaldehyde and an appropriate 1-substituted-piperazine preferably at a temperature between 50° C. and about 150° C. The formaldehyde can be in the form of an aqueous solution, i.e. 40% formalin solution, or a polymeric form of formaldehyde such as paraformaldehyde or trioxymethylene. When such polymeric forms are used, a molar excess of mineral acid, for example hydrochloric acid, is added to regenerate the free aldehyde from the polymer. The reaction is preferably carried out in an organic solvent inert under the conditions of the reaction, such as ethanol, methanol, or 3-methylbutanol.

The novel compounds of the instant invention are the bases of Formula I and the acid-addition and quaternary ammonium salts of said bases, and said acid-addition and quaternary ammonium salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

The quaternary ammonium salts are obtained by the addition of esters of strong acids to the free base form of the compounds, said esters having a molecular weight less than about 200. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluene-sulfonate, benzyl chloride, benzyl bromide, and substituted benzyl halides, such as p-chlorobenzyl chloride, p-nitrobenzyl chloride, p-methoxybenzyl chloride, o-chlorobenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

It is also possible to convert one quaternary ammonium salt to another in which the anion is different. If the anion of the original quaternary salt forms a water-insoluble silver salt the quaternary salt will react with silver oxide in aqueous medium to form the corresponding quaternary ammonium hydroxide, the original anion being removed as a precipitate. The quaternary ammonium hydroxide solution can then be neutralized with any desired salt in which the anion is different from that of the original salt. In this way quaternary ammonium salts in which the anion is derived from a weak acid can be prepared.

It will thus be appreciated that Formula I not only represents the structural configuration of the bases of my invention but is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition and quaternary ammonium salts of my new bases are useful and valuable compounds, regardless of considerations of solubility, toxicity, physical form, and the like, and are accordingly within the purview of the instant invention.

The novel feature of the compounds of the invention, then resides in the concept of the bases and cationic forms of the new 1 - [(benz[g]-indolyl)-lower-alkyl]-4-substituted-piperazines and not in any particular acid or quaternary moiety or acid anion associated with the salt forms of my compounds; rather, the acid or quaternary moieties or anions which can be associated in the salt forms are in themselves neither novel nor critical and therefore can be any acid anion or acid-like substance capable of salt formation with bases. In fact in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid, organic mono- and polysulfonic and -sulfinic acids, organic phosphonic and phosphinic acids, organic acids of arsenic and antimony, organic heterocyclic carboxylic, sulfonic, and sulfinic acids, acidic ion-exchange resins, and inorganic acids of any acid forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, p-aminophenylarsinic acid, phenylstibnic acid, phenylphosphinous acid, methylphosphonic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I has demonstrated that they possess a variety of depressant actions on the autonomic nervous system, the cardiovascular system, and the skeletal muscular system. They depress psychomotor activity as evidenced by studies in mice in standard activity cages; they possess sedative activity as shown by the potentiation of sleeping time in mice induced by ether, thiopental sodium, or hexobarbital sodium. They show skeletal muscle relaxant activity in mice in the inclined screen test. When administered to rats, they show adrenolytic activity as evidenced by antagonism of the pressor effects of epinephrine; they lower the rectal temperature in mice; they possess anti-convulsant activity in mice as evidenced by their ability to protect mice from pentylenetetrazol-induced convulsions; they lower the blood pressure in rats; and they show cardiovascular activity in dogs as evidenced by the increase in heart force. These activities indicate their usefulness as tranquilizers, sedatives, skeletal muscle relaxants, adrenolytic agents, hypothermic agents, anti-convulsants, hypotensive agents, and cardiovascular agents.

Thus in sedative activity tests in mice using the hexobarbital potentiation test described by Wylie, Proc. Soc. Exptl. Biol. Med. 98, 716–718 (1958), 1-[2-(2-methylbenz [g]-3-indolyl)ethyl]-4-phenylpiperazine was found to have an $ED_{50}$ of $73 \pm 17.3$ mg./kg. on intraperitoneal administration.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

EXAMPLE 1

1 - [2 - (2 - methylbenz[g] - 3 - indolyl)ethyl] - 4 - phenylpiperazine [I: Het is benz[g] - 3 - indolyl; Y is $CH_2CH_2$; R is $C_6H_5$]

A solution of 9 g. (0.057 mole) of α-naphthylhydrazine, in 100 ml. of acetone, was heated to boiling on a steam bath, and the solvent was removed by distillation. The residue was dissolved in 50 ml. of acetone and 150 ml. of acetic acid and the mixture heated on a steam bath for one hour. The solvent was removed in vacuo, the residue dissolved in 300 ml. of acetic acid, and the mixture saturated with anhydrous hydrogen chloride. After refluxing for twelve hours, the solvent was removed in vacuo and the residue poured into cold water giving a solid which was collected, dried, dissolved in benzene, and chromatographed on a column of alumina. The fraction melting at 132–139° C. was recrystallized from heptane giving 5.5 g. of 2-methylbenz[g]-indole, M.P. 132.5–136° C. (uncorr.).

The above 2-methylbenz[g]-indole (5.5 g., 0.03 mole) was dissolved in 75 ml. of anhydrous ether, and the solution treated with a solution of 12.0 g. (0.095 mole) of oxalyl chloride in 20 ml. of ether while stirring and maintaining the temperature at −10° C. When addition was complete, the mixture was stirred for thirty minutes and the yellow precipitate collected, washed with ether and dried, giving 6.5 g. of (2-methylbenz[g]-3-indolyl)glyoxalyl chloride. The latter (6.5 g., 0.03 mole) was added as a solid over a period of two minutes to a stirred solution of 14.5 g. (0.09 mole) of 1-phenylpiperazine in 250 ml. of tetrahydrofuran while maintaining the temperature at 5° C. The solution was stirred for one hour at 0° C. and for an additional two hours at room temperature and then poured into one liter of an ice-water mixture. The solid which separated was collected, washed with water, air dried, and recrystallized from an ethanol-acetone mixture giving 6.5 g. of 1-[(2-methylbenz[g]-3 - indolyl)glyoxalyl] - 4 - phenylpiperazine, M.P. 295–298° C. (uncorr.).

Six grams (0.015 mole) of the product were reduced with twelve grams (0.03 mole) of lithium aluminum hydride in 400 ml. of tetrahydrofuran by refluxing the mixture for twenty-four hours. The excess lithium aluminum hydride was decomposed by careful addition of water, and the mixture was filtered from the solid precipitate. Washing the filter with tetrahydrofuran, evaporation of the combined filtrates to dryness, and recrystallization of the crude product from a benzene-ethanol mixture gave 3.4 g. of 1 - [2 - (2 - methylbenz[g] - 3 - indolyl)ethyl]-4-phenylpiperazine, M.P. 163.0–165.0° C.

1 - [2 - (2 - methylbenz[g] - 3 - indolyl)ethyl] - 4-phenylpiperazine can be reacted with hydriodic acid to form 1 - [2 - (2 - methylbenz[g] - 3 - indolyl)ethyl] - 4-phenylpiperazine hydriodide, useful as a characterizing intermediate.

1 - [2 - (2 - methylbenz[g] - 3 - indolyl)ethyl] - 4-phenylpiperazine, in the form of its hydriodide salt, can be converted to the hydrochloride salt by passing an aqueous solution of the former over an ion-exchange resin saturated with chloride ions.

1 - [2 - (2 - methylbenz[g] - 3 - indolyl)ethyl] - 4-phenylpiperazine can be converted to its hydriodide salt and the latter recrystallized for purification purposes from an appropriate organic solvent. On suspension of the hydriodide in dilute aqueous sodium hydroxide, extraction of the suspension with chloroform, and removal of the chloroform from the extracts, 1-[2-(2-methylbenz-[g]-3-indolyl)ethyl]-4-phenylpiperazine can be recovered in purified free base form.

EXAMPLES 2-24

By reacting benz[g]indole with dimethylamine and formaldehyde, reacting the resulting 3-dimethylaminomethylbenz[g]indole with sodium cyanide, hydrolyzing the resulting 3-cyanomethylbenz[g]indole with concentrated hydrochloric acid, reacting the resulting (benz[g]-3-indolyl)acetic acid with isobutyl chloroformate in acetone in the presence of triethylamine, reacting the resulting mixed anhydride with an appropriate 1-substituted-piperazine and reducing the resulting 1-[(benz[g]-3-indolyl)acetyl] - 4 - substituted - piperazine with lithium aluminum hydride using the procedure described above in Example 1, there can be obtained the compounds of Formula I in Table 1 below where Y, in each instance, is 1,2-ethylene.

TABLE 1

| Example 1 | R | Piperazine substituent |
|---|---|---|
| 2 | $CH_3$ | |
| 3 | $HOCH_2CH_2$ | |
| 4 | $4-ClC_6H_4$ | |
| 5 | $3-CH_3C_6H_4$ | $2-CH_3$ |
| 6 | $4-HOC_6H_4$ | |
| 7 | $2-CH_3OC_6H_4$ | $6-CH_3$ |
| 8 | $3,4-OCH_2OC_6H_3$ | $3-CH_3$ |
| 9 | $3,4-OCH_2CH_2OC_6H_3$ | $6-CH_3$ |
| 10 | $4-CH_3SC_6H_4$ | $2-n-C_4H_9$ |
| 11 | $4-CH_3SOC_6H_4$ | $3-CH(CH_3)_2$ |
| 12 | $4-CH_3SO_2C_6H_4$ | $2,2-di-CH_3$ |
| 13 | $4-CF_3C_6H_4$ | $2,5-di-CH_3$ |
| 14 | $4-NO_2C_6H_4$ | $2-CH_3$ |
| 15 | $3-CH_3COC_6H_4$ | |
| 16 | $4-NH_2SO_2C_6H_4$ | |
| 17 | $3,4,5-(CH_3O)_3C_6H_2$ | |
| 18 | $2-Cl-4-CH_3C_6H_3$ | |
| 19 | $C_6H_5CH_2$ | $2,6-di-CH_3$ |
| 20 | $C_6H_5CH=CHCH_2$ | $3,6-di-CH_3$ |
| 21 | $(C_6H_5)_2CH$ | $2,5-di-n-C_3H_7$ |
| 22 | $2-C_5H_4N$ | |
| 23 | $C_6H_{11}CH_2$ | |
| 24 | $C_3H_5CH_2$ | |

EXAMPLE 25

1-[2-(benz[g]-3-indolyl)ethyl]-2,6-dimethylpiperazine
[I: Het is benz[g]-3-indolyl; Y is $CH_2CH_2$; R is H]

By reducing the 1-[2-(benz[g]-3-indolyl)ethyl]-4-benzyl-2,6-dimethylpiperazine described above in Example 19 with hydrogen over a palladium-on-charcoal catalyst in an ethanol solvent, there is obtained 1-[2-(benz[g]-3-indolyl)-ethyl]-2,6-dimethylpiperazine.

EXAMPLE 26

1-[benz[g]-3-indolyl)methyl]-4-phenylpiperazine
[I: Het is benz[g]-3-indolyl; Y is $CH_2$; R is $C_6H_5$]

By reacting benz[g]indole with formaldehyde and 1-phenylpiperazine in glacial acetic acid, there can be obtained 1-[(benz[g]-3-indolyl)methyl]-4-phenylpiperazine.

EXAMPLES 27-29

By reacting benz[g]indole with formaldehyde and dimethylamine in anhydrous ethanol, converting the resulting 3-dimethylaminomethylbenz[g]indole to the methiodide quarternary salt, reacting the latter with diethyl malonate in the presence of sodium ethoxide, and saponifying the product by heating with dilute sulfuric acid, there is obtained β-(benz[g]-3-indolyl) propionic acid.

By reducing the latter with lithium aluminum hydride in tetrahydrofuran using the manipulative procedure described above in Example 1, reacting the resulting 2-(benz[g]-3-indolyl)ethanol with thionyl chloride in the presence of pyridine, reacting the resulting 2-(benz[g]-3-indolyl)ethyl chloride with sodium cyanide, and hydrolyzing the resulting γ-(benz[g]-3-indolyl)butyronitrile with aqueous sodium hydroxide, there is obtained γ-(benz[g]-3-indolyl)butyric acid.

By reducing the latter with lithium aluminum hydride, reacting the resulting 4-(benz[g]-3-indolyl)butanol with thinoyl chloride in the presence of pyridine, reacting the resulting 4-(benz[g]-3-indolyl)butyl chloride with diethyl malonate in the presence of sodium ethoxide, and saponifying the product by heating with dilute sulfuric acid, there is obtained ω-benz[g]-3-indolyl)hexanoic acid.

By following the manipulative procedure described above in Examples 2–24, substituting for the (benz[g]-3-indolyl)acetic acid used therein and appropriate (benz[g]-3-indolyl)-lower-alkanoic acid, prepared as described above, and reducing the resulting 1-[(benz[g]-3-indolyl)-lower-alkanoyl] - 4 - substituted-piperazine with lithium aluminum hydride using the manipulative procedure described above in Example 1, there can be obtained the compounds of Formula I in Table 2 below, where Het, in each instance, is benz[g]-3-indolyl, and R is phenyl.

TABLE 2

| Example: | Y |
|---|---|
| 27 | $(CH_2)_3$ |
| 28 | $(CH_2)_4$ |
| 29 | $(CH_2)_6$ |

I claim:
1. A compound of the formula

wherein Het is benz[g]indolyl; R is hydrogen or lower-alkyl, hydroxy-lower-alkyl, phenyl, phenyl-lower-alkyl, benzhydryl, phenyl-lower-alkenyl, cycloakyl-lower-alkyl, or pyridyl; and Y is lower-alkylene of from one to six carbon atoms.

2. A compound according to claim 1 wherein R is phenyl.

3. 1 - [2 - (2 - methylbenz[g] - 3 - indolyl)ethyl] - 4-phenyl-piperazine according to claim 1 wherein Het is 2-methylbenz[g]-3-indolyl; and Y is 1,2-ethylene.

References Cited

UNITED STATES PATENTS

| 2,800,474 | 7/1957 | Voegtli | 260—268 |
| 3,004,975 | 10/1961 | Grob et al. | 260—268 X |
| 3,133,930 | 5/1964 | Werner | 260—268 X |
| 3,142,678 | 7/1964 | Rice et al. | 260—268 X |
| 3,282,942 | 11/1966 | Rice et al. | 260—268 |

DONALD G. DAUS, Primary Examiner

U.S. Cl. X.R.

260—258, 309, 326.13; 424—250

UNITED STATES PATENT OFFICE
CERTIFICATE OF CORRECTION

Patent No. 3,472,855  Dated October 14, 1969

Inventor(s) Sydney Archer

It is certified that error appears in the above-identified patent and that said Letters Patent are hereby corrected as shown below:

Column 1, line 16, " 1-[benz " should read -- 1-[(benz --; line 17, ":nd:ca+ad" should read --indicated--; line 25, "patent" should read --patented--; line 41, "alkelene" should read --alkylene--; line 49, "staright" should read --straight- Column 3, line 15, that part of the flow diagram showing

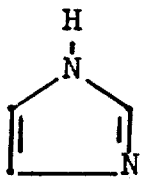

should instead show

2 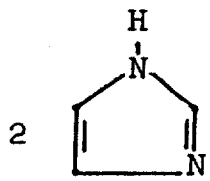   ;

line 72, " 1-[benz " should read -- 1-[(benz --. Column 4, line 66, " 1-[benz " should read -- 1-[(benz --. Column 9, line 50, " 1-[benz " should read -- 1-[(benz --. Column 10, line 41, "cycloakyl" should read --cycloalkyl--.

(SEAL)
Attest:

Edward M. Fletcher, Jr.
Attesting Officer

SIGNED AND SEALED
JUN 2 1970

WILLIAM E. SCHUYLER, JR.
Commissioner of Patents